(12) United States Patent
Slaby et al.

(10) Patent No.: US 8,397,982 B2
(45) Date of Patent: Mar. 19, 2013

(54) METHOD AND DEVICE FOR RECOGNITION OF DOCKING STATIONS

(75) Inventors: Jiri Slaby, Buffalo Grove, IL (US); Roger W Ady, Chicago, IL (US); Paul M Pierce, Grayslake, IL (US); Karl R. Voss, Schaumburg, IL (US); Charles B. Woodhull, San Francisco, CA (US)

(73) Assignee: Motorola Mobility LLC, Libertyville, IL (US)

( * ) Notice: Subject to any disclaimer, the term of this patent is extended or adjusted under 35 U.S.C. 154(b) by 48 days.

(21) Appl. No.: 12/971,944

(22) Filed: Dec. 17, 2010

(65) Prior Publication Data

US 2012/0153016 A1   Jun. 21, 2012

(51) Int. Cl.
*G06F 17/00* (2006.01)
*G06F 1/16* (2006.01)
*G06F 3/00* (2006.01)
*G06K 7/10* (2006.01)
*H04B 1/38* (2006.01)

(52) U.S. Cl. .................. 235/375; 235/454; 235/462.01; 361/679.02; 455/557; 710/8; 710/303

(58) Field of Classification Search .................. 235/375, 235/454, 462.01–462.49; 361/679.02–679.61; 455/557; 710/8, 330, 303
See application file for complete search history.

(56) References Cited

U.S. PATENT DOCUMENTS

| | | | |
|---|---|---|---|
| 5,280,229 A | 1/1994 | Faude et al. | |
| 5,742,149 A | 4/1998 | Simpson | |
| 6,994,575 B1 | 2/2006 | Clark et al. | |
| 7,352,567 B2 | 4/2008 | Hotelling et al. | |
| 7,480,138 B2 | 1/2009 | Kogan et al. | |
| 7,719,830 B2 | 5/2010 | Howarth et al. | |
| 2005/0071520 A1* | 3/2005 | Hull et al. | 710/8 |
| 2006/0221051 A1 | 10/2006 | Flynt et al. | |
| 2006/0250764 A1 | 11/2006 | Howarth et al. | |
| 2007/0174490 A1 | 7/2007 | Choi et al. | |
| 2008/0140868 A1 | 6/2008 | Kalayjian et al. | |
| 2008/0280268 A1 | 11/2008 | Kelley et al. | |
| 2009/0088203 A1* | 4/2009 | Havens et al. | 455/556.1 |
| 2009/0088204 A1 | 4/2009 | Culbert et al. | |
| 2009/0096870 A1 | 4/2009 | Zheng | |
| 2009/0127327 A1* | 5/2009 | Rani | 235/375 |

(Continued)

FOREIGN PATENT DOCUMENTS

| | | | |
|---|---|---|---|
| DE | 19651781 A1 | 7/1997 | |
| EP | 1708075 A2 | 10/2004 | |

(Continued)

OTHER PUBLICATIONS

Motorola, "Multimedia Stations for DROID by Motorola", p. 1, http://www.motorola.com/Consumers/US-EN/Consumer-Product-and-Services/Mobile+Phone+Accessories/Chargers-and-Adapters/DROID-Multimedia-Station-US-EN.

(Continued)

*Primary Examiner* — Michael G Lee
*Assistant Examiner* — Laura Gudorf

(57) ABSTRACT

A method for controlling an electronic device for use with a docking station is disclosed. The method includes detecting a coupling of the electronic device with the docking station, obtaining an image of an identifier associated with the docking station in response to detecting the coupling, and performing a predefined operation by the electronic device based on the image of the identifier in response to obtaining the image.

17 Claims, 9 Drawing Sheets

U.S. PATENT DOCUMENTS

| | | | |
|---|---|---|---|
| 2009/0132197 A1 | 5/2009 | Rubin et al. | |
| 2009/0187677 A1 | 7/2009 | Hunt et al. | |
| 2010/0008650 A1 | 1/2010 | Bull et al. | |
| 2010/0131691 A1* | 5/2010 | Chatterjee et al. | 710/303 |
| 2010/0227493 A1 | 9/2010 | Guy et al. | |

FOREIGN PATENT DOCUMENTS

| | | |
|---|---|---|
| EP | 1613073 A1 | 1/2006 |
| GB | 2451943 A | 2/2009 |
| WO | 2006077453 A1 | 7/2006 |

OTHER PUBLICATIONS

Apple Universal Dock, 2009, pp. 1-80, www.apple.com/support.

Icy Dock, "MB881US-1S-1 EZ-Dock eSATA & USB SATA HDD Docking Station", 1 page, http://www.icydock.com/product/images/mb881_kit.jpg.

Patent Cooperation Treaty, International Search Report and Written Opinion of the International Searching Authority for International Application No. PCT/US2011/036756, Sep. 9, 2011, 13 pages.

United States Patent and Trademark Office, "Non-Final Office Action" for U.S. Appl. No. 12/789,985 dated Jul. 30, 2012, 12 pages.

United States Patent and Trademark Office, "Notice of Allowance and Fee Due" for U.S. Appl. No. 12/609,864 dated Sep. 21, 2011, 8 pages.

United States Patent and Trademark Office, "Notice of Allowance and Fee Due" for U.S. Appl. No. 12/609,864 dated Dec. 2, 2011, 8 pages.

* cited by examiner

METHOD AND DEVICE FOR RECOGNITION OF DOCKING STATIONS

RELATED APPLICATIONS

The present application relates to U.S. application Ser. No. 12/609,864 to Jiri Slaby, et al., filed Oct. 30, 2009, the contents of which are incorporated herein by reference.

FIELD OF THE DISCLOSURE

The present disclosure relates generally to electronic devices and docking stations and more particularly to a method for recognizing a docking station for maximizing user experience of an electronic device.

BACKGROUND

Electronic devices, including telephones and other portable devices, are increasingly being upgraded with improvised applications and functionalities. For example, cellular telephones include features such as video streaming, two-way video calling, email functionality, internet browsing, music, BLUETOOTH® file sharing etc. Such electronic devices are nonetheless becoming more than simply communication devices by evolving into powerful tools for information management and entertainment.

The various functionalities and applications of electronic devices are better utilized using docking stations. For example, as a music player, an electronic device may include a connector, such as a micro Universal Serial Bus (USB), a head set jack, a High-Definition Multimedia Interface (HDMI), and other similar connectors which can connect to an accessory such as speakers to deliver loud sound from the device. For internet browsing, an electronic device may include a connector, such as a micro USB, a mini USB, a head set jack, a HDMI, a micro HDMI, and other similar connectors which can connect to an accessory such a large display screen that can provide a larger display of the content on the device. Docking stations may also provide accessories such as auxiliary power and/or battery charging.

A user of an electronic device may connect the electronic device to different docking stations at various places. At each of these places, the user may desire to access one particular functionality and/or application of the electronic device more often compared to the rest. However, the plethora of functionalities and applications that the electronic device can offer makes it cumbersome for the user of the electronic device to access the desired functionality in the requisite time.

Accordingly, there is a need for a method and device for facilitating an access to various functionalities and applications of an electronic device for better utilizing the docking stations in order to personalize the user experience at particular locations.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1B:
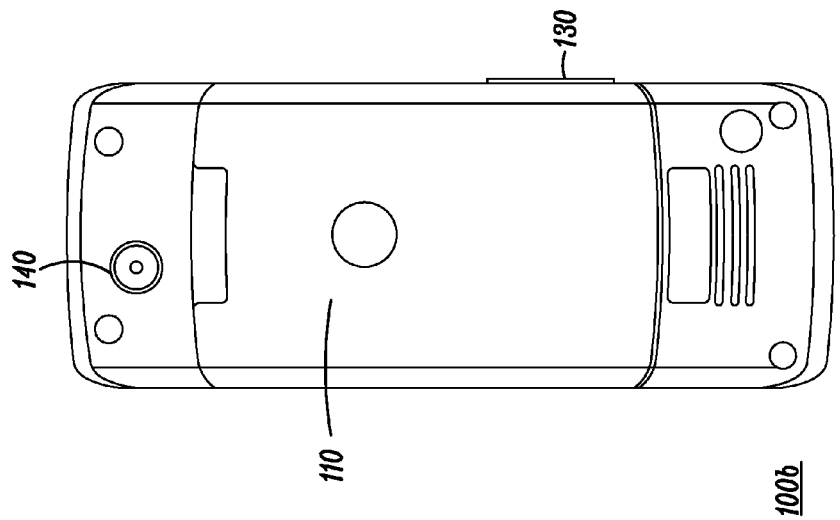
FIG. 1A depicts a front view and FIG. 1B depicts a back view of an electronic device and its various components in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An electronic device and a method for identifying a docking station and directing the electronic device to perform a predetermined operation based on the identified docking station is enclosed herewith. The electronic device includes an imager and a light source. Further, the docking station includes an identifier, unique to the particular docking station. The electronic device, on detecting a coupling with the docking station, obtains an image of the identifier on the docking station, and compares the obtained image in order to determine the identifier and the associated docking station. The electronic device then performs a predetermined operation based on the determined identifier. The invention is further explained below with reference to the figures.

Figure 1A:
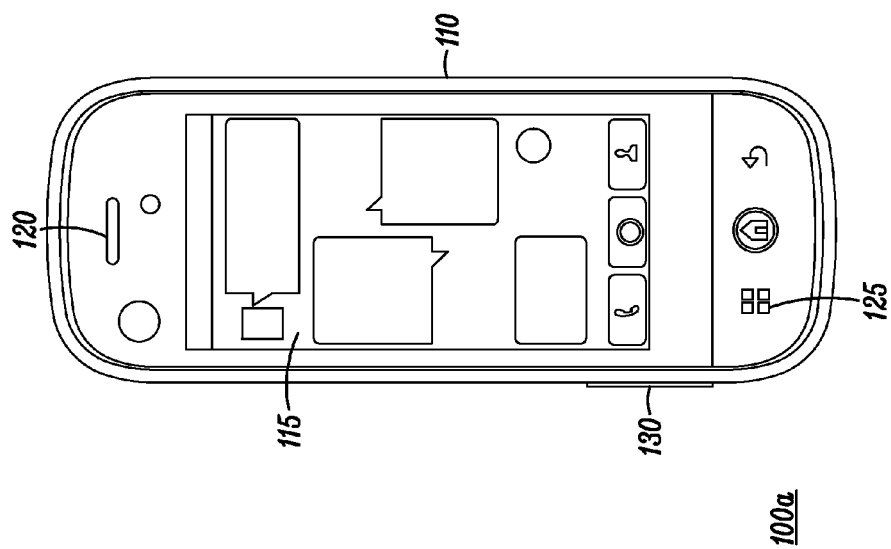

FIG. 1A shows a detailed front view and FIG. 1B shows a detailed back view of an electronic device. FIG. 1A shows a particular orientation of the electronic device and FIG. 1B shows another orientation of the same electronic device. The electronic device may be a wireless device or a wired device or any other electronic device. In the example of FIGS. 1A and 1B, the electronic device being referred to is a wireless communication device. The electronic device may include a housing 110, a display 115, a speaker 120, a keypad 125, and an external power port 130. The housing 110 supports various components of the electronic device. The display 115 displays various visuals to the user of the electronic device. The display 115 may also display a touch keypad (not shown) for use by the user of the electronic device. The speaker 120 converts the incoming electrical signals into audio signals for reception by the user of the electronic device. The keypad 125 may include keys for accepting or declining an incoming call, a delete or cancel key, navigation keys, and alphanumeric keys etc. The display 115, the speaker 120, and the keypad 125 are also commonly referred to as user interfaces, as they allow the user of the electronic device to interface with the electronic device.

FIG. 1B shows an imager 140 and the external power port 130. The imager 140 may be a fixed focus imager or an adjustable focus imager such as a macro focus imager and is used for obtaining images of various near or far objects. The electronic device may further include a flash (not shown) configured on the back view shown in FIG. 1B. The flash illuminates a target while the imager 140 obtains an image of the target. In one particular example, the flash can be a Xenon flash. Further, the external power port 130 as shown in the front view in FIG. 1A and back view in FIG. 1B, is used for receiving power from an external power source for charging a battery of the electronic device and further for operating the electronic device. The external power port 130 can be any of a micro USB port, a mini USB, an HDMI, a micro HDMI, or other types of interfaces. The electronic device is described in more detail with respect to FIG. 2.

Figure 2:
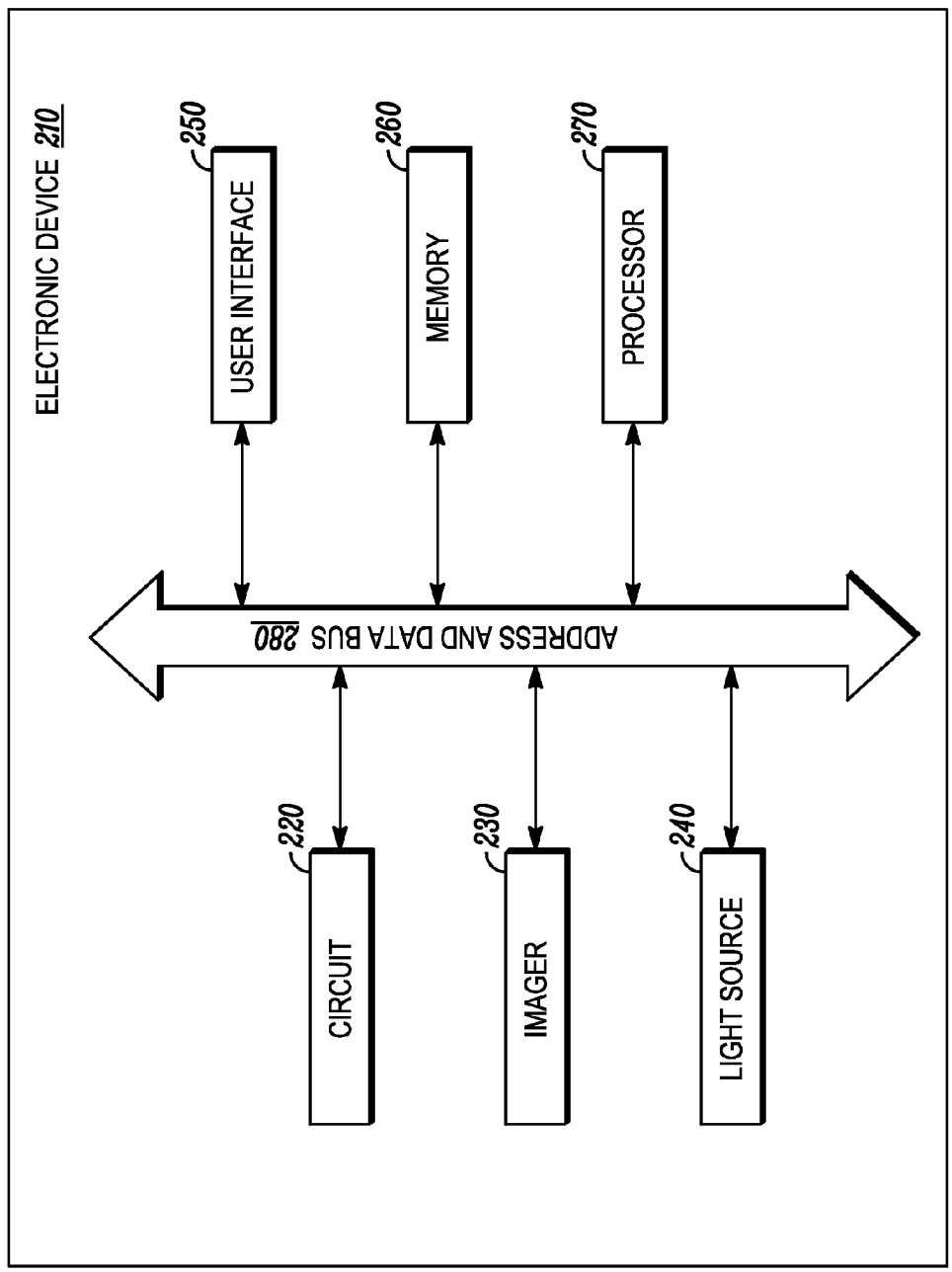
FIG. 2 is a block diagram of an electronic device in accordance with an embodiment of the invention.

FIG. 2 is a block diagram 200 of an electronic device 210 in accordance with some embodiments of the invention. The electronic device 210 includes a circuit 220, an imager 230, a light source 240, a user interface 250, and a memory 260 coupled to a processor 270 via an address and data bus 280. The circuit 220 includes various electronic components coupled to each other through various wired and wireless connections. The circuit 220 may comprise amongst other circuits and components, a transceiver (not shown) for transmitting and receiving signals. The circuit 220 may further include the external power port 130 (shown in FIGS. 1A and 1B). The circuit 220 is mounted on the housing 110 (shown in FIGS. 1A and 1B).

The circuit 220 is configured to detect a coupling of the electronic device 210 with a docking station by detecting an increase in power received by one or more circuits of the electronic device 210. The coupling of the electronic device 210 to the docking station can be any one of a wired or a wireless coupling. In one example, the electronic device 210 is physically hardwired to the docking station in order to couple the electronic device 210 to the docking station. In another example, the electronic device 210 is coupled to the docking station using a short range wireless technology such as a dedicated short range communication (DSRC), BLUETOOTH®, Wi-Fi®, ZigBee®, wireless-charging technologies such as inductive charging, RF Power transmission, etc. Once the circuit 220 detects any one of the above couplings in response to detecting an increase in the power supply received from the docking station, the circuit 220 provides a primary confirmation of the coupling between the electronic device 210 and the docking station to the processor 270.

Optionally, the circuit 220 looks for additional secondary confirmations of the coupling between the electronic device 210 and the docking station. In order to provide these secondary confirmations, the circuit 220 includes various sensors and provides the information sensed by the sensors to the processor 270 via the address and data bus 280. In one example, the circuit 220 includes a first sensor (not shown) that determines an orientation of the electronic device 210. In one particular example, the first sensor can be an accelerometer or a gyroscope. The first sensor then transmits the orientation information to the processor 270 via the address and data bus 280. The processor 270 then compares the orientation determined by the first sensor with predetermined orientations stored in a memory 260 of the electronic device 210.

The various predetermined orientations include all the valid orientations obtained while coupling the electronic device 210 with the docking station. In one example, such valid orientations are pre-stored into the memory 260 of the electronic device as a look-up table by a user of the electronic device. In another example, the valid orientations are pre-stored into the memory 260 of the electronic device by a manufacturer of the electronic device. In yet another example, such valid orientations are dynamically recorded by the electronic device 210 during each instance when the electronic device 210 is successfully coupled to the docking station, and are stored in the form of the look-up table in the memory 260 of the electronic device. In this example, the success of coupling of the electronic device is defined as receiving various primary and the secondary confirmations of the coupling between the electronic device 210 and the docking station in the above mentioned instances.

The processor 270 compares the orientation determined by the first sensor to each of the various predetermined orientations in the look up table. If a match is found during the comparison, the processor 270 provides a secondary confirmation of the coupling between the electronic device 210 and the docking station to itself However, if no match is found during the comparison, the processor 270 deactivates the imager 230 of the electronic device 210.

In another example, in addition to the first sensor, the circuit 220 includes a second sensor (not shown) that determines a time interval for which the electronic device 210 remains in the particular determined orientation after the above secondary confirmation has been provided by the first sensor. The second sensor transmits the determined time interval to a processor 270 via the address and data bus 280. If the time interval determined by the second sensor exceeds a threshold value stored in the memory 260, the processor 270 provides another secondary confirmation of the coupling between the electronic device 210 and the docking system. In case the determined time interval is less than the threshold value stored in the memory 260, the processor 270 deactivates the imager 230 of the electronic device 210. The threshold value is pre-stored into the memory 260 of the electronic device 210 by either a user or a manufacturer of the electronic device 210. Further, the user can adjust the threshold value based on their personal preferences and needs. For example, if the user wants the threshold to be increased, the user can do so via an appropriate menu (that may be displayed on a display, such as the display 115, shown in FIG. 1A) that will result in modification of the previously stored threshold value.

In yet another example, the second sensor may determine a time interval for which the circuit 220 detects the increase in power received by one or more circuits of the electronic device 210 after the primary confirmation. The circuit 220 transmits the time interval for which the increase in power is detected to the processor 270 via the address and data bus 280. If the time interval determined by the second sensor in this case exceeds a threshold value stored in the memory 260, the processor 270 provides a secondary confirmation of the coupling between the electronic device 210 and the docking system. In case the determined time interval is less than a threshold value stored in the memory 260, the processor 270 deactivates the imager 230 of the electronic device 210. The threshold value may be selected in similar ways as suggested above i.e. the threshold value may be pre-stored by a user or a manufacturer and can be dynamically updated by the processor 270 of the electronic device 210.

Further, after a primary confirmation and/or one or more secondary confirmations have been obtained by the processor 270, the imager 230 obtains an image of the identifier of the docking station. The imager 230 corresponds to the imager 140 of FIG. 1B and is used for obtaining an image of a near or a far object. In one particular example, the imager 230 is a fixed focus imager and obtains an image of the identifier on the docking station with a fixed focus. In another example, the imager 230 is an adjustable focus imager and obtains the image of the identifier on the docking station by adjusting a focus or focal length of a lens of the imager 230. Further, such adjustment of the focus of an imager 230 can be either performed manually or automatically using an auto-focus feature of the imager 230.

The imager 230 may obtain the image of the identifier with or without using a light source 240. In one particular case, the use of the light source 240 is decided by the processor 270 based on determining the ambient light. In another case, the electronic device 210 can prompt a user to decide whether to use the light source 240 or not. The light source 240 is used for illumination purpose and is particularly used for illuminating the identifier while the imager 230 obtains the image of the identifier on the docking station when the electronic device 210 is coupled to the docking station.

The user interface 250 comprises the display 115, the speaker 120, and the keypad 125 (as shown in FIG. 1A) which are used to interface with the electronic device 210. The user interface 250 may additionally include components such as a microphone (not shown) and other external interfaces which may be used to connect to a peripheral device. Further, the memory 260 is used for storage of information in the electronic device 210 and may include a volatile memory and a non-volatile memory. The volatile memory is used for storing temporary data that is erased every time the electronic device 210 is powered off. The non-volatile memory is used for storing permanent type of data.

Further, after the imager 230 obtains the image of the identifier on the docking station with or without using the light source 240, the processor 270 compares the obtained image to a list of predefined images in the memory 260 of the electronic device 210. The processor may use a various number of ways for such a comparison of the obtained image. One possible way is to pre-store information in the form of a look-up table in the memory 260 of the electronic device 210. The look-up table in the memory 260 stores information relating to each of the identifiers on the various docking stations in the form of a plurality of associated images, locations corresponding to each of the identifiers, and the predetermined operations associated with each of the identifiers. In one case, the look-up table can be pre-stored into the memory 260 by a manufacturer or a user of the electronic device 210. Moreover, in this case, the pre-stored look-up table may be updated by the user when the user updates his preferences for a particular location associated with a particular docking station. In another case, the processor 270 of the electronic device 210 dynamically updates the look-up table based on recording historical data associated with the electronic device 210. In this case, the processor 270 records the various images of the identifiers corresponding to various docking stations, as obtained by the imager 230. The processor 270 also records the various operations performed by the electronic device, when coupled to a particular docking station corresponding to the recorded identifier. When similar operations are performed, by the electronic device 210 when coupled with the particular docking station having the particular recorded identifier, for more than n number of times, the processor 270 associates these operations with the particular recorded identifier, and stores the association of the operations and the particular identifier in the memory 260 of the electronic device 210 as the updated look-up table to display the particular application when the electronic device is again coupled to docking station in the future.

Further, the electronic device 210 compares the obtained image with the pre-stored plurality of associated images of identifiers in the look-up table to find a match. For example, the electronic device 210 processes the obtained image prior to comparing the obtained image to the plurality of associated images in the look-up table in the memory 260. Such processing of the obtained image may include, amongst other things, enhancing the obtained image into a sharper image using various processing techniques.

After a match is found, the processor 270 can determine a location of the docking station associated with the identifier whose image has been obtained by the imager 230. The processor 270 makes the above determination of the location based on comparing the obtained image with the pre-stored images in the look-up table in the memory 260. The look-up table in the memory 260 stores entries that include an association between the various identifiers related to various docking stations, the locations associated with these identifiers, various other electronic devices present at each of these associated locations, and the predetermined operations associated with each of these identifiers.

In one particular case, after determining the location based on comparing the obtained image with the entries in the look-up table, the processor 270 determines a list of other electronic devices available in the vicinity of the determined location and establishes a wireless connection with one or more of these electronic devices in the determined list. Once the wireless connection has been established, the electronic device may receive one or more confirmation messages from the one or more electronic devices with which the wireless connection has been established. The one or more confirmation messages can additionally confirm the location of the docking station. In addition to the above, once the wireless connection between the electronic device and the one or more electronic devices has been established, the electronic device instructs the one or more electronic devices to perform a function from a list of functions. The list of functions includes, amongst other things, playing music and video.

In addition to the above, once the processor determines a match for a particular obtained image in the look-up table in the memory 260, the electronic device 210 identifies the predetermined operation associated with the identified match, and performs the predefined operation on the electronic device 210 corresponding to the match.

The predefined operations include, but are not limited to, displaying at least one application on a display of the electronic device 210, adjusting a brightness of the display, adjusting a contrast of the display, adjusting a touch lens sensitivity of the display, adjusting a volume of a speaker and/or loudspeaker, activating an input key, activating or de-activating certain connectivity technologies (such as Wi-Fi®, BLUETOOTH®, etc.), or enabling or disabling particular notification profiles such as silent profile, vibration profile, ringing profile etc. In one example, the displaying of applications includes displaying a music player, a time clock, an email folder, a text message folder, and/or a contact book etc. In another example, navigational icons for particular applications are displayed as a predetermined operation. These navigational icons may be displayed in the form of a grid or list. In another example, the predefined operation can be increasing or decreasing a brightness and/or contrast of a display of electronic device 210. In yet another example, the predefined operation may be adjusting a sensitivity of a touch lens of the display. In this particular example, the touch lens sensitivity of a particular part of the display is increased and/or the touch lens for another part of the display is decreased. In another example, a volume of the speaker of the electronic device 210 is adjusted or/and an input key is activated for receiving input from a user. In another example, a particular notification profile may be enabled or disabled. For instance, a silent notification profile may be activated.

In one particular embodiment of the invention, the above predefined operations are programmed into the electronic device 210 by a user of the electronic device 210. The user can provide various predefined operations associated with various identifiers corresponding to their respective docking stations.

In another embodiment, the predefined operation is dynamically updated by the electronic device 210 automatically based on a predetermined criterion. In one example, the predetermined criterion is a frequency of usage of a plurality of applications. In another example, the predetermined criterion is a log of user interface settings that are used by the electronic device 210 when the electronic device 210 is coupled with a particular docking station. In these examples, every time the electronic device 210 is coupled with one particular docking station, the electronic device 210 monitors the applications and user interface settings being used after coupling. After a particular number of monitoring events (say, n number of such instances), the most frequently used applications or user interface settings are displayed on the display of the electronic device 210, when it is determined that the electronic device 210 is again coupled to the particular docking station i.e. when the electronic device 210 is coupled for the n+1 instance to the docking station. In another example, the predetermined criterion is a time of access of the plurality of applications by the electronic device 210 when the electronic device 210 is coupled with a particular docking station. In this case, the processor 270 stores the last accessed application or last user interface settings applied to the electronic device 210 in the memory 260, when the electronic device 210 was last coupled with the particular docking station. In an event when it is determined, based on identifying an identifier of the docking station, that the electronic device 210 is again coupled to the same docking station, the processor 270 retrieves the applications or settings that were last used by the electronic device 210 when it was coupled with the particular docking station, and executes the retrieved application or settings. In another case, the processor 270 stores the last accessed applications or last user interface settings applied to the electronic device 210 including the particular times at which such applications were accessed or settings were applied. Later on, the processor 270 retrieves these applications and settings based on the time of the day when a user couples the electronic device 210 with a particular docking station. For instance, in the morning (say, between 9 a.m. to 10 a.m.), email may appear on a display of the electronic device, when the electronic device is coupled to a docking station placed in location A whereas in the evening (say, between 6 p.m. to 7 p.m.), at the same location A, a music player appears on the display. It should be understood by one of ordinary skill in the art that any other applications or settings pre-selected and stored by the user, or learned by the device, or defined by factory, are possible).

Figure 3:
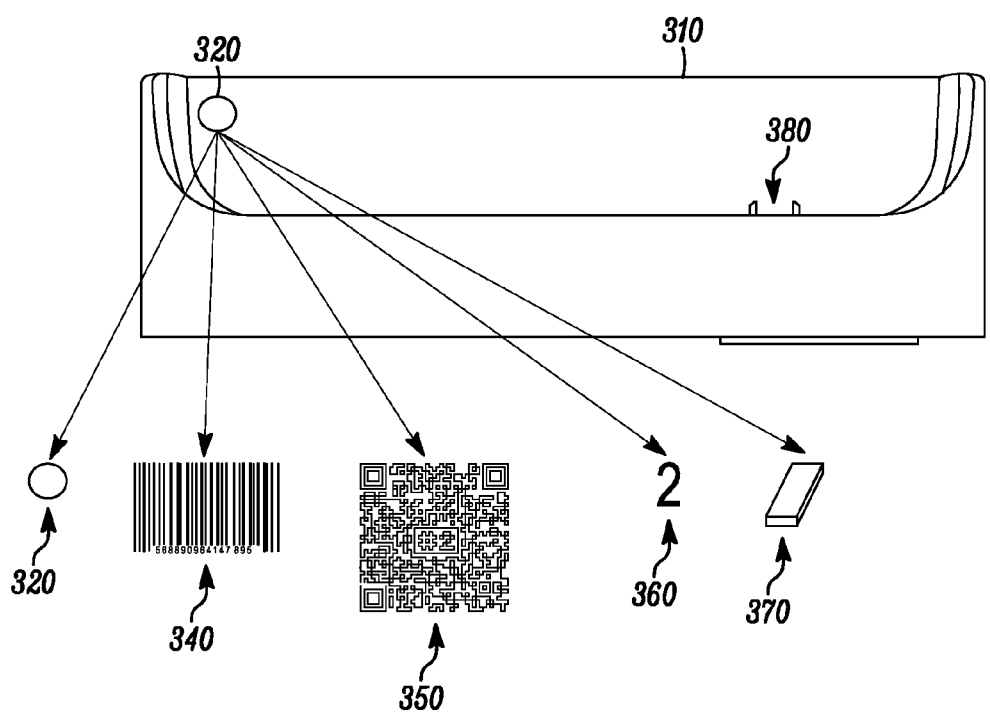
FIG. 3 is a view of a docking station and its various components including an identifier and its various types in accordance with an embodiment of the invention.

FIG. 3 is a view of a docking station 310. The docking station 310 may be any one of a dedicated docking station for power supply, a personal computer, a gaming device, etc. The docking station 310 includes an identifier 320 which may or may not be a separate part, and a power supply port 380. In one example, the identifier 320 may be a fixed part of the docking station 310. In another example, the identifier 320 may be a separate part from the docking station such that the identifier may be detachable and/or implanted onto the docking station 310. In another example, the identifier 320 may protrude out of the surface of the docking station 310. In yet another example, the identifier 320 may be embedded into the surface of the docking station such that the identifier 390 does not protrude out of the surface of the docking station 310. Further, the docking station 310 may include a power supply port 380. The power supply port 380 may be used for supplying power to the electronic device, such as the electronic device 210 shown in FIG. 2, coupled to the docking station 310. The identifier 320 may be suitably located anywhere on the docking station 310 such that when an electronic device 210 is coupled to the docking station 310, the identifier 320 is in the line of sight of the imager 140 (as depicted in FIG. 1B) of the electronic device 210.

FIG. 3 further shows that the identifier 320 can be of any type, shape, and/or color. For example, the different types of identifiers 320 on the docking station 310 include, but are not limited to, a color code 330, a bar code 340, a Q code 350, symbol code 360, and a shape code 370, or combination of the above. A color code identifier 330 includes an identifier using a particular color. A bar code identifier 340 includes an identifier varying in the widths and the spacing of parallel lines. A Q code identifier 350 is a standardized collection of three-letter message encodings, also known as a brevity code, all of which start with the letter "Q". A symbol code identifier 360 can include any numbers, alphabets, alpha-numeric symbols, or any other symbols. A shape code identifier 370 can include any patterns of squares, dots, hexagons and other geometric patterns.

Further the electronic device 210 can be coupled to the docking station 310 in different ways. In one embodiment, the electronic device 210 is coupled to the docking station 310 in an orientation such that the imager 140 (shown in FIG. 1B) of the electronic device 210 is offset from the identifier 320 of the docking station 310. This is further explained in the forthcoming paragraphs with reference to FIG. 4.

Figure 4:
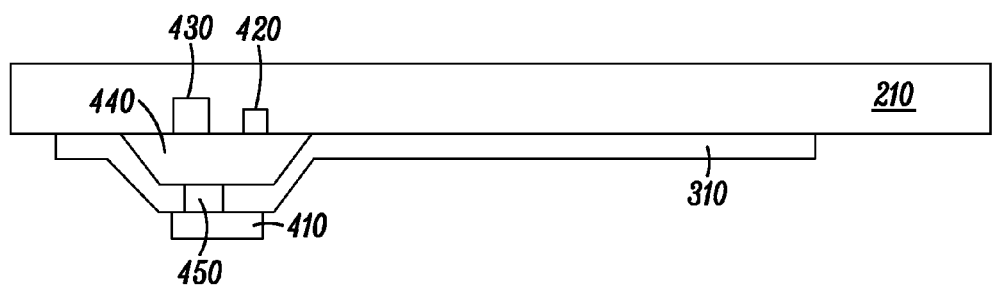
FIG. 4 is a diagram of a docking station coupled to an electronic device in accordance with an embodiment of the invention.

FIG. 4 is a diagram 400 of a electronic device, such as the electronic device 210 of FIG. 2, coupled with a docking station, such as the docking station 310 of FIG. 3, such that there is a plenum 440 between the imager 430 of the electronic device 210 and the identifier 450 of the docking station 310 when the electronic device 210 is coupled to the docking station 310. In this case, the electronic device 210 may either be physically or wirelessly coupled to the docking station 310. The plenum 440 between the imager 430 and the identifier 450 indicates a space between the imager 430 and the identifier 450 such that the imager 430 and the identifier 450 are remote or offset from each other.

For example, in one case, the electronic device 210 and the docking station 310 are wirelessly coupled and the plenum 440 between the imager 430 and the identifier 450 is a space. In this case, although the imager 430 is remote from the identifier 450 of the docking station 310 due to the presence of the plenum 440 between the imager 430 and the identifier 450, the identifier 450 is in the line of sight of the imager 430. Further in this case, where the imager 430 and the identifier 450 are situated offset or remote from each other due to the plenum 440, the imager 430 can obtain an image of the identifier 450 by adjusting a focus of the imager 430 in order to obtain a sharper image of the identifier 450. In one example, the focusing of the lens of the imager 430 is performed manually by a user of the electronic device 210. In another example, the focusing of the lens of the imager 430 is performed automatically using an auto-focus functionality of the imager 430. In yet another example, no focusing of the lens of the imager is performed when the identifier 450 is a color code, shape code, or a symbol code. This is because the color of the color coded identifier can be identified even if the image is not sharp. Also, the contours of the shape coded identifiers and symbol coded identifiers can be recognized even if the image is not sharp, using processing techniques, if required.

FIG. 4 additionally shows an optional light guide 410. A light guide 410 couples light from the light source 420 to the identifier 450 for illuminating the identifier 450. In another example, the light from the light source 420 is transmitted to the optional light guide 410 which further reflects the transmitted light onto the identifier 450 for illuminating the identifier 450. The light guide 410 is optional because it only enhances the amount of light that ultimately reaches the identifier 450 from the light source 420. Therefore, it improves the quality of image captured by the imager 430 by better illuminating the identifier 450. The use of light guide 410 is therefore at the discretion of the manufacturer of the docking station 310.

Referring back to FIG. 3, in another embodiment, the electronic device 210 is coupled to the docking station 310 such that the imager 140 of the electronic device 210 is placed adjacent to the identifier 320 of the docking station 310 upon coupling the electronic device 210 with the docking station 310. This is further explained in the forthcoming paragraphs with regard to FIG. 5.

Figure 5:
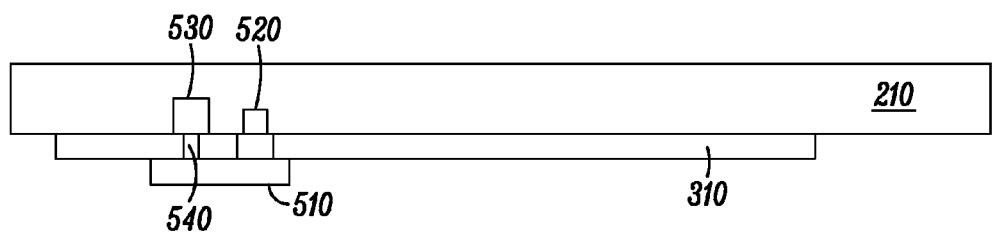
FIG. 5 is another diagram of a docking station coupled to an electronic device in accordance with another embodiment of the invention.

FIG. 5 is a diagram of a electronic device, such as the electronic device 210 of FIG. 2, coupled with a docking station, such as the docking station 310 of FIG. 3, such that the electronic device 210 and the identifier 540 of the docking station 310 are placed adjacent to each other when the electronic device 210 is coupled to the docking station 550. The identifier 540 is in the line of sight of the imager 530. Further in this case, where the imager 530 and the identifier 540 are situated adjacent to each, the imager 530 can obtain an image of the identifier 540 without adjusting a focus of the imager 530. As such, this embodiment is particularly useful for identifiers 540 such as color coded identifiers, symbol coded identifiers, or shape coded identifiers. For these cases, even if the imager 530 obtains the image of the identifier 540 without adjusting the focus of the imager 530 such that the images obtained are not sharp enough even after processing the images, the identifier 540 can still be identified from the images by the electronic device 210. This is because the color of the color coded identifier can be identified even if the image is not sharp. Also, the contours of the shape coded identifiers and symbol coded identifiers can be recognized even if the image is not sharp, using processing techniques, if required. Therefore, particularly for these identifiers, when the imager and identifier are situated adjacent to each other, the image can be obtained without any focal adjustment on the part of the imager 530. For example, in one case, the identifier 540 is a color coded identifier and the imager 530 is a fixed-focus imager and obtains the image of the identifier 540 without adjusting the focus. However, in some cases, the above method of obtaining the image of the identifier 540 without adjusting the focus of the imager 530 can be extended to other identifiers besides color coded identifiers, shape coded identifiers, and symbol coded identifiers. In these cases, processing techniques may be used to further sharpen and clarify the images obtained without adjusting the focus.

FIG. 5 additionally shows an optional light guide 510. The light guide 510 can be used to couple light from the light source 520 to the identifier 540 for illuminating the identifier 540. In another example, the light from the light source 520 is transmitted to the optional light guide 510 which further reflects the transmitted light onto the identifier 540 for illuminating the identifier 540. The light guide 510 is optional because it only enhances the amount of light that ultimately reaches the identifier 540 from the light source 520 and is a design choice for obtaining better images.

Referring back to FIG. 3, once the electronic device 210 is coupled to the docking station 310 in any of the above two ways and has captured an image of the identifier 320 of the docking station 310, the electronic device 210 performs a suitable predetermined operation based on the obtained image. In one example, the electronic device 210 identifies a one or more predetermined operations associated with the captured image and performs the one or more predetermined operations, thus identified. The electronic device 210 can determine these predetermined operations by comparing the image obtained by the imager 230 with images stored in a look-up table in the memory 260. The look-up table in the memory 260 stores entries that include an association between images associated with various identifiers related to various docking stations, the locations associated with these identifiers, various other electronic devices present at each of these associated locations, and the predetermined operations associated with each of these identifiers. Thus, when the electronic device 210 compares the obtained image to the entries in the look-up table, a match may be found. The electronic device then determines the predetermined operations associated with this match. These predetermined operations can provide personalized user experience at particular locations without having the user listing through multiple applications or menus or functionalities of the electronic device 210. The above invention is explained in more detail with reference to the flowchart of FIG. 6.

Figure 6:
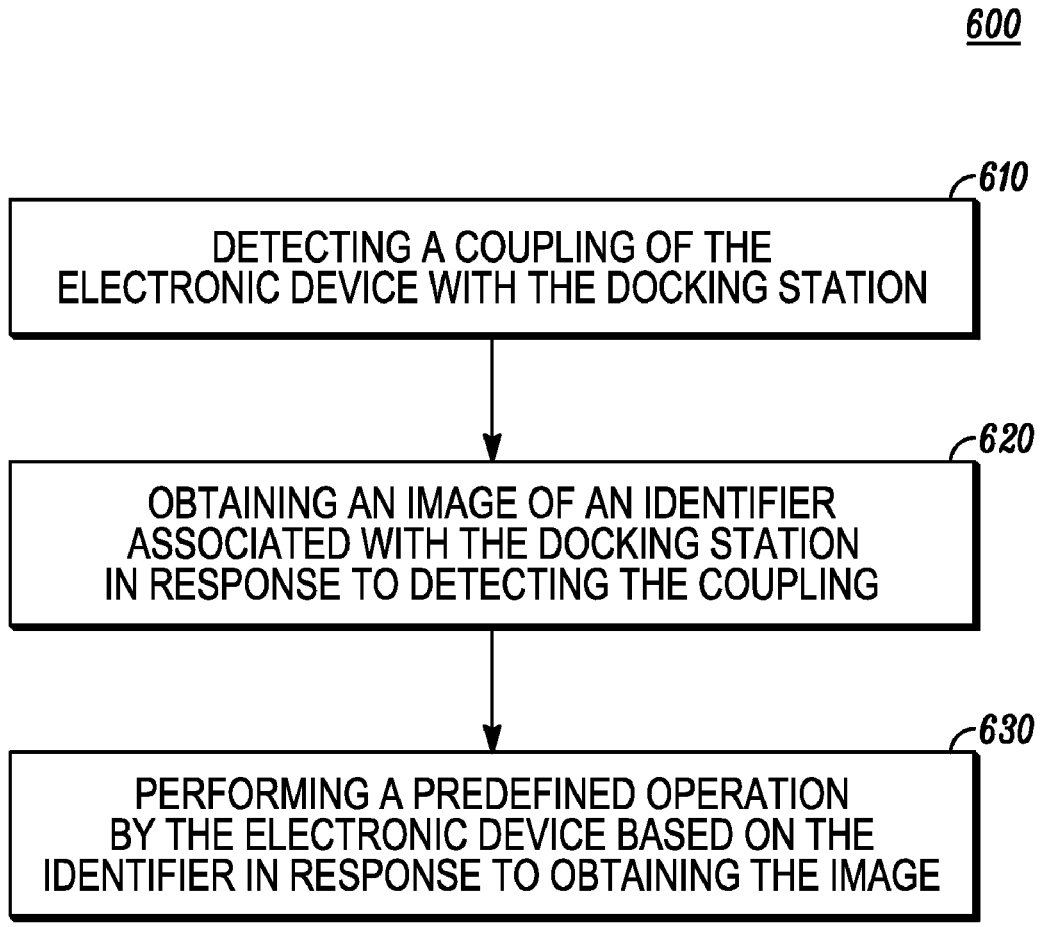
FIG. 6 is a flowchart of a method for performing a predetermined operation on a electronic device based on recognizing an identifier associated with a docking station in accordance with an embodiment of this invention.

FIG. 6 is a method 600 of performing a predetermined operation by an electronic device in accordance with some embodiments of this invention. The method starts when an electronic device detects 610 a coupling of the electronic device with a docking station. The coupling can be any one of a wired or a wireless coupling and may further involve any one of a mechanical, electrical, or electronic connection of the electronic device with the docking station. In one example, the coupling between the electronic device and the docking station can be based on short range wireless communication techniques such as BLUETOOTH®, WiFi®, and ZigBee® or wireless power such as inductive charging, RF Power transmission etc. In another case, the coupling between the electronic device and the docking station is based on physically hard-wiring the electronic device to the docking station. The electronic device detects and confirms the coupling when one or more circuits of the electronic device detect an increase in the power received from the docking station. This is the primary confirmation of the coupling between the electronic device and the docking station.

In addition to the above primary confirmation, the electronic device may optionally look for additional secondary confirmations of the coupling between the electronic device and the docking station. In one example, a processor of the electronic device detects an orientation of the electronic device using various sensors such as an accelerometer or a gyroscope after the primary confirmation. The processor of the electronic device then compares the determined orientation with various predetermined orientations stored in a memory of the electronic device.

In another example, the processor of the electronic device detects a unique engagement signature made by coupling the electronic device to the docking station. The engagement signature is a combination of a motion signature and a sensed location. For example, an electronic device may be placed on a docking station and such an act of placement may provide a unique motion signature, which may be detected by an accelerometer and/or a gyroscope. The second component of the engagement signature is sensing the location preferably through GPS (Global Positioning System) or the like. Thus the combination of the motion signature and the sensed location provide an engagement signature. On obtaining the engagement signature, the electronic device compares the obtained engagement signature with various predetermined engagement signatures, stored in the memory of the electronic device. Therefore, the predetermined orientations and/or the engagement signatures may be used for obtaining secondary confirmation by the electronic device. Moreover, in another example, only a part of the engagement signature such as motion signature or sensed location may be used for obtaining secondary confirmation.

The predetermined orientations and engagement signatures are valid orientations and engagement signatures respectively, obtained when the electronic device is successfully coupled to the docking station. In one case, such valid orientations and valid engagement signatures may be pre-stored in the electronic device as a look-up table by a user of the electronic device. In another case, the valid orientations and valid engagement signatures may be pre-stored in the electronic device as the look-up table by a manufacturer of the electronic device. In yet another case, such valid orientations and valid engagement signatures may be dynamically recorded by the electronic device in each instance when the electronic device is successfully coupled to the docking station, and are stored in the form of the look-up table in the electronic device. The look-up table may further store parts of the valid engagement signature independently such as a location sensed during successful coupling of the electronic device 210 with the docking station. In this case, the success of coupling of the electronic device is defined as receiving various primary and the secondary confirmations of the coupling between the electronic device 210 and the docking station in the above mentioned instances.

If a match is found while comparing the current determined orientation and/or determined engagement signatures and/or a part of the engagement signature such as the sensed GPS locations with the predetermined orientations and/or valid engagement signatures and/or locations stored in the list in the memory, the electronic device provides itself with a secondary confirmation of the coupling between the electronic device and the docking station. However, if no match is found during the comparison, the processor deactivates the imager of the electronic device.

In another example, the electronic device determines a time interval for which the electronic device remains in the particular determined orientation after the above secondary confirmation. If the determined time interval exceeds a threshold value stored in the memory of the electronic device, the processor provides another secondary confirmation of the coupling between the electronic device and the docking system. In case the determined time interval is less than the threshold value stored in the memory of the electronic device, the processor deactivates the imager of the electronic device. In yet another example, the electronic device determines a time interval for which the electronic device detects an increase in power after the primary confirmation of the coupling between the electronic device and the docking station has been obtained. If the determined time interval exceeds a threshold value stored in the memory of the electronic device, the processor provides another secondary confirmation of the coupling between the electronic device and the docking system. In case the determined time interval is less than the threshold value stored in the memory of the electronic device, the processor deactivates the imager of the electronic device. The threshold value is pre-stored into the electronic device by either a user or a manufacturer of the electronic device. Further, the user can adjust the threshold value based on their personal preferences and needs. For example, if the user wants the threshold to be increased, the user can do so via an appropriate menu (that may be displayed on a display, such as the display 115, shown in FIG. 1A) that will result in modification of the previously stored threshold value.

The electronic device then obtains 620 an image of an identifier of the docking station in response to detecting the coupling of the electronic device with the docking station. The image of the identifier can be obtained by adjusting a focus of the imager of the electronic device when the electronic device is coupled to the docking station such that there is plenum or space between the imager of the electronic device and the identifier of the docking station resulting in the imager being offset from the identifier as depicted in FIG. 4. In these cases, where there is a plenum between the imager and the identifier, the adjusting of the focal length leads to a sharper image. In some cases, the images thus obtained may be further processed for improving the sharpness and clarity of the image. In some other cases, however, no adjustment of the focal length is required because the identifiers are either color coded dots or shape coded identifiers. This is because the colors of color coded dots and contours of shape coded identifiers are decipherable even if the image obtained is not so sharp due to non-adjustment of the focal length. Further, in some cases, the images thus obtained without focal adjustment, may be processed for increasing the sharpness prior to deciphering, as explained below In another embodiment, when the electronic device is coupled to the docking station such that there is no plenum or space between the imager and the identifier on the docking station and the imager is placed adjacent to the identifier, as depicted in FIG. 5, the imager obtains the image of the identifier without adjusting a focus of the imager. As explained with reference to FIG. 5, this embodiment is particularly useful in cases where the identifier is a color-coded dot or a shape coded dot. In these cases, the imager obtains the image of the identifier without adjusting the focus because even if the image is not very sharp, the colors of color coded dots and contours of shape coded identifiers are still decipherable. In some cases, the images thus obtained without adjusting the focus may be first subjected to processing and then deciphered. However, for some cases, the above method of obtaining the image without adjusting the focus of the imager may be extended to other types of identifiers. In these cases, the images thus obtained, may be further processed for clarity and sharpness.

After the electronic device obtains 620 the image of the identifier, the electronic device deciphers the obtained image by mapping or comparing the obtained image of the identifier with a plurality of images in a memory of the electronic device. The electronic device may use a various number of ways for such a mapping of the obtained image. One possible way is to pre-store information in a look-up table in the memory of the electronic device. The look-up table stores information relating to each of the identifiers associated with various docking stations in the form of a plurality of associated images, locations corresponding to each of the identifiers, electronic devices available in each of the locations, and the predetermined operations associated with each of the identifiers. In one case, the look-up table can be pre-stored into electronic device by a manufacturer or a user of the electronic device. In another case, the electronic device dynamically updates the look-up table based on recording historical data associated with the electronic device. In this case, the electronic device records the various images of the identifiers corresponding to various docking stations, as obtained by the imager of the electronic device. The electronic device also records the various operations performed by the electronic device, when coupled to a particular docking station corresponding to the recorded identifier. When the electronic device determines that a same operation is performed a particular number of times after coupling with the particular docking station, the electronic device associates this operations with the recorded identifier of the particular docking station, and stores the association of the operation, the particular identifier, and the docking station in the electronic device.

Further, the electronic device compares the obtained image with the images of identifiers in the look-up table to find a match. In one example, the electronic device processes the obtained image prior to comparing the obtained image to the plurality of associated images in the look-up table. Such processing of the obtained image may include, amongst other things, enhancing the obtained image into a sharper image using various processing techniques.

After a match is found, the electronic device can determine a location associated with the obtained image based on comparing the image with the entries in the look-up table in the memory. The electronic device further determines a list of electronic devices available in the vicinity of the determined location and establishes a wireless connection with one or more these electronic devices from the plurality of devices in the determined list. Once the wireless connection has been established, the electronic device may receive one or more confirmation messages from the one or more electronic devices with which the wireless connection has been established. The one or more confirmation messages can additionally act as a confirmation of the location of the electronic device. In addition to the above, once the wireless connection between the electronic device and the one or more electronic devices has been established, the electronic device may instruct the one or more electronic devices to perform a function from a list of functions. The list of functions includes, amongst other things, playing music and video. In another case, user can define the operations and applications as well as described below.

In addition to the above, after a match for a particular obtained image is found in the look-up table, the electronic device performs 630 a predefined operation corresponding to the match.

The predefined operations include, but are not limited to, displaying at least one application on a display of the electronic device, adjusting a brightness of the display, adjusting a contrast of the display, adjusting a touch lens sensitivity of the display, adjusting a volume of a speaker, activating or de-activating certain connectivity technologies (such as Wi-Fi®, BLUETOOTH®, etc.), or enabling or disabling particular notification profiles such as silent profile, vibration profile, ringing profile etc. In one example, the displaying of applications includes displaying a music player, a time clock, an email folder, a text message folder, and/or a contact book etc. In another example, navigational icons for particular applications are displayed as a predetermined operation. These navigational icons may be displayed in the form of a grid or list. In another example, the predefined operation can be increasing or decreasing a brightness and/or contrast of a display of electronic device. In yet another example, the predefined operation may be adjusting a sensitivity of a touch lens of the display. In this particular example, the touch lens sensitivity of a particular part of the display is increased and/or the touch lens for another part of the display is decreased. In another examples, a volume of the speaker of the electronic device is adjusted or/and an input key is activated for receiving input from a user.

In one particular embodiment of the invention, the above predefined operations are programmed into the electronic device by a user of the electronic device. The user can provide various predefined operations associated with various identifiers corresponding to their respective docking stations. In another embodiment, the predefined operation is dynamically updated by the electronic device based on a predetermined criterion. In one example, the predetermined criterion is a frequency of usage of a plurality of applications. In another example, the predetermined criterion is a log of user interface settings that are used by the electronic device when the electronic device is coupled with a particular docking station. In these examples, every time the electronic device is coupled with one particular docking station, the electronic device monitors the applications and user interface settings being used after the coupling. After a particular number of monitoring events (say, n number of such instances), the most frequently used applications or user interface settings are updated in the look-up table in the memory of the electronic device. The look up table stores an association between particular identifiers and the most frequently used applications or user interface settings at these identifiers. The applications and/or settings are then displayed on the display of the electronic device in future when it is determined that the electronic device is again connected to the particular docking station i.e. when the electronic device is connected for the n+1 instance to the docking station. In another example, the predetermined criterion is a time of access of the plurality of applications by the electronic device when the electronic device is coupled with a particular docking station. In this case, the electronic device stores the last accessed application or last user interface settings applied to the electronic device, when the electronic device was last coupled with the particular docking station. In an event when it is determined, based on identifying an identifier of the docking station, that the electronic device is again coupled to the same docking station, the electronic device retrieves the applications or settings that were last used by the electronic device when it was coupled with the particular docking station, and runs the retrieved application or settings.

Figure 7:
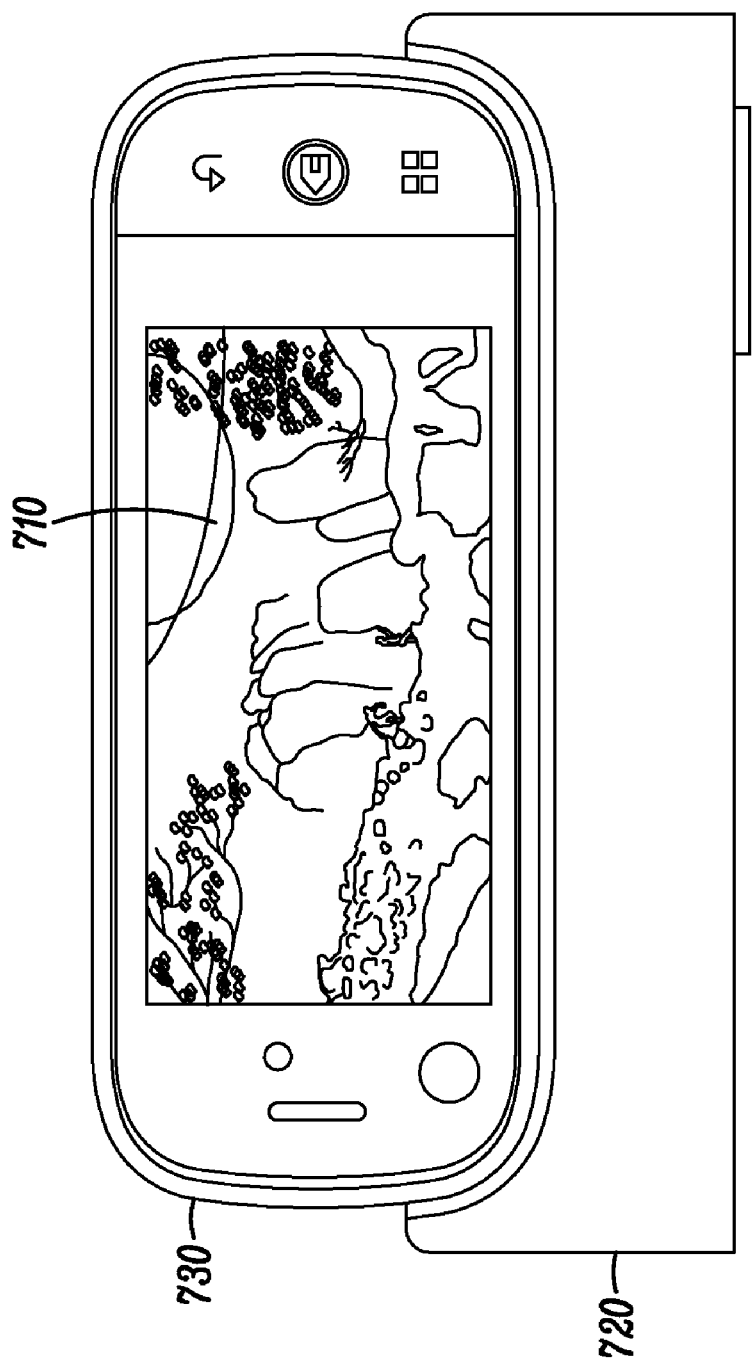
FIG. 7 is an exemplary view of a predetermined operation performed by an electronic device in accordance with an embodiment of the invention.

For instance, FIG. 7 shows an example of the predefined operation performed by the electronic device in accordance with an embodiment of the invention. The electronic device 730 is docked into a docking station 720 by the user of the electronic device 730. On receiving a confirmation of the coupling between the electronic device 730 and the docking station 720 using any of the primary or secondary confirmation techniques described above, the electronic device 730 captures an image of the identifier (not shown) of the docking station 720 with or without adjusting a focus of an imager (now shown) of the electronic device 730. Further, the electronic device 730 determines a predetermined operation associated with the obtained image. Such determination can be carried out using a database pre-stored in the electronic device 730 by a user of the electronic device, or based on automatic update of the database by the electronic device based on a frequency of usage of various applications or a log of times of access of various applications etc. In this example, the electronic device 730 determines that the obtained image of the identifier corresponds to a "home location" of the user of the electronic device 930 and the associated predetermined operation to be performed is displaying a particular screen saver 710. In this case, the screensaver 710, which is a picture of a landscape, is displayed, as shown in FIG. 7.

Figure 8:
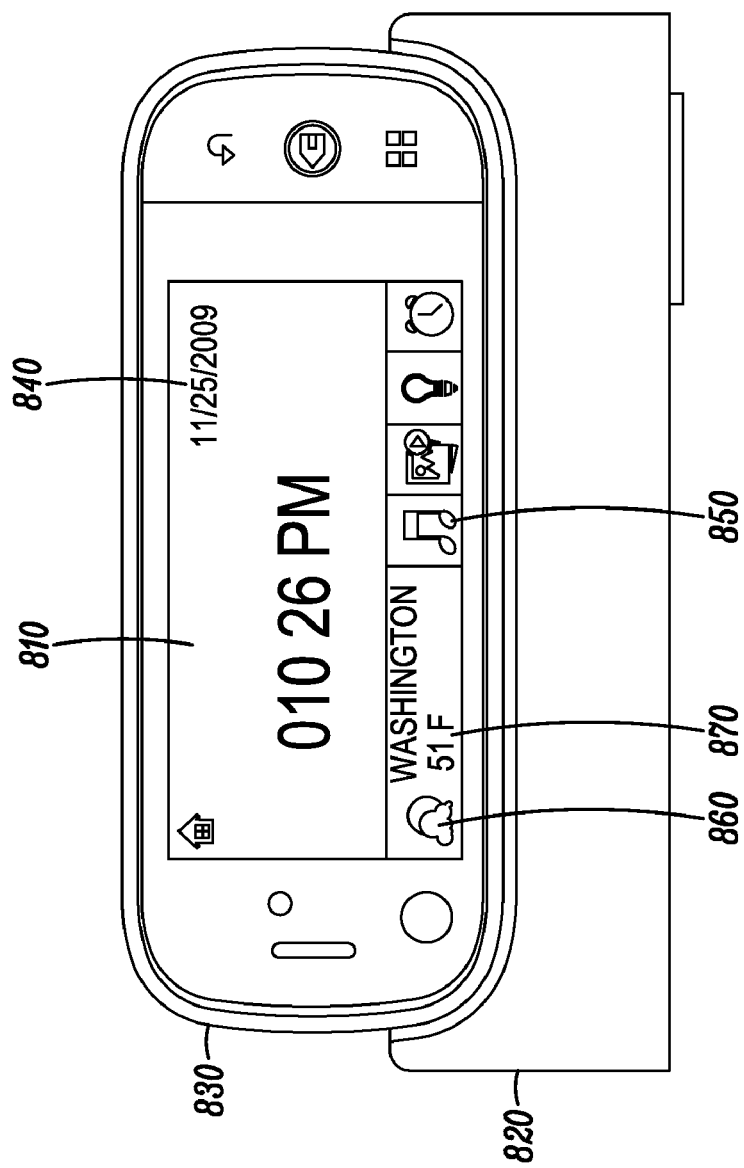
FIG. 8 is another exemplary view of a predetermined operation performed by an electronic device in accordance with another embodiment of the invention.

FIG. 8 shows another example of the predetermined operation performed by the electronic device 830 in accordance with an embodiment of the invention. In FIG. 8, the user of the electronic device 830 couples the electronic device 830 with a docking station. On receiving a confirmation of the docking between the electronic device 830 and the docking station 820 using any of the primary or secondary confirmation techniques described above, the electronic device 830 captures an image of the identifier (not shown) of the docking station 820 with or without adjusting a focus of an imager (not shown) of the electronic device 830. Further, the electronic device 830 determines a predetermined operation associated with the obtained image. Such determination can be carried out using a database pre-stored in the electronic device 830 by a user of the electronic device 830, or based on automatic update of the database by the electronic device 830 based on a frequency of usage of various applications or a log of times of access of various applications etc. In this example, the electronic device 830 determines that the obtained image of the identifier corresponds to a "bedroom" location of the user of the electronic device 830 and the associated predetermined operation is displaying a particular wallpaper 810 that includes a displaying the date 840, icons 850, a weather report 860, and a city 870 as displayed in FIG. 8.

Figure 9:
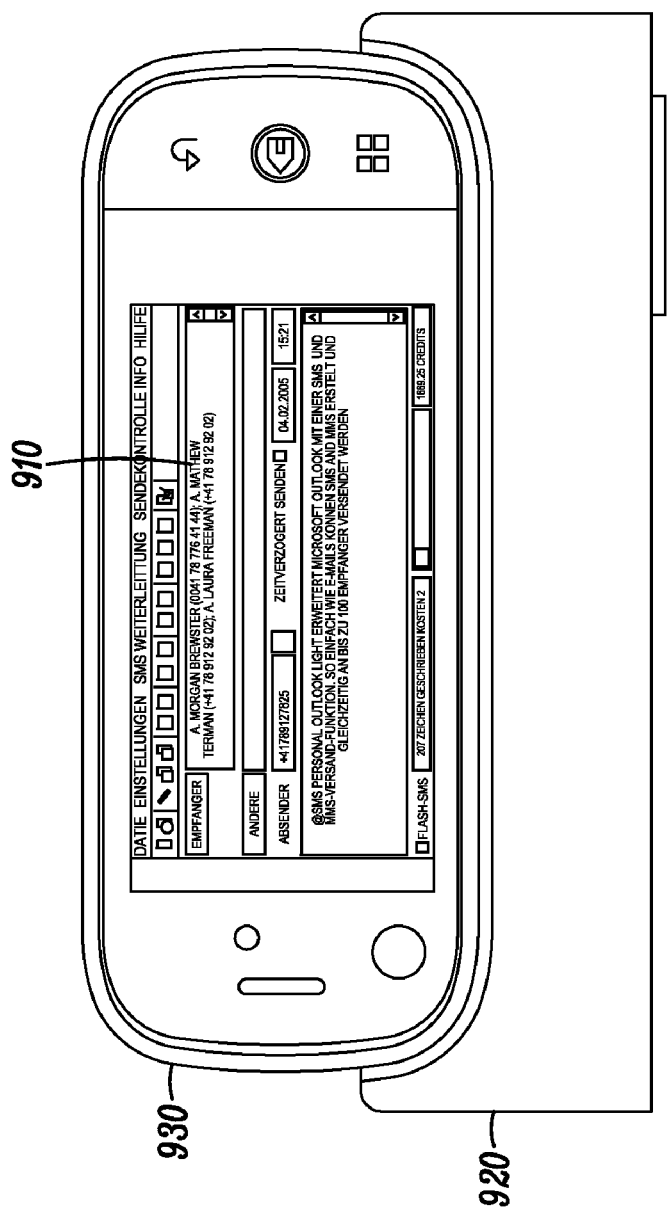
FIG. 9 is yet another exemplary view of a predetermined operation performed by an electronic device in accordance with yet another embodiment of the invention.

FIG. 9 shows yet another example of the predetermined operation performed by the electronic device 930 in accordance with an embodiment of the invention based on identifying an identifier associated with a docking station. In FIG. 9, the user of the electronic device 930 couples the electronic device 930 with a docking station 920. On receiving a confirmation of the coupling between the electronic device 930 and the docking station 920 using any of the primary or secondary confirmation techniques described above, the electronic device 930 captures an image of the identifier (not shown) of the docking station 920 with or without adjusting a focus of an imager (not shown) of the electronic device 930. Further, the electronic device 930 determines a location and a predetermined operation associated with the obtained image. Such determination can be carried out using a database pre-stored in the electronic device 930 by a user of the electronic device, or based on automatic update of the database by the electronic device based on a frequency of usage of various applications or a log of times of access of various applications etc. In this example, the electronic device 930 determines that the obtained image of the identifier corresponds to a location "office" and is further associated with the predetermined operation of displaying the email application 910 of the electronic device, as shown in FIG. 9.

Figure 10:
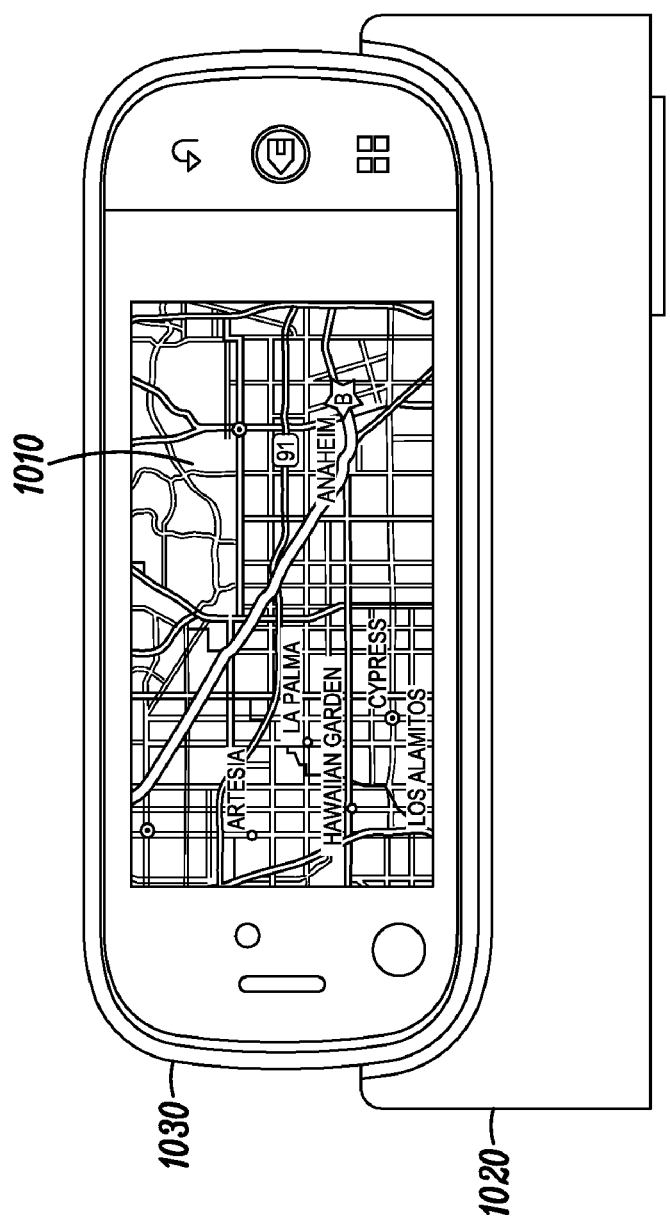
FIG. 10 is yet another exemplary view of a predetermined operation performed by an electronic device in accordance with yet another embodiment of the invention.

FIG. 10 shows yet another example of the predetermined operation performed by the electronic device in accordance with an embodiment of the invention based on identifying an identifier associated with a docking station. In FIG. 10, the user of the electronic device 1030 couples the electronic device 1030 with a docking station 1020 in an unrecognized docking station. On receiving a confirmation of the coupling between the electronic device 1030 and the docking station 1020 using any of the primary or secondary confirmation techniques described above, the electronic device 1030 captures an image of the identifier (not shown) of the docking station 1020 with or without adjusting a focus of an imager (not shown) of the electronic device 1030. Further, the electronic device 1030 compares the obtained image with various images stored in a database of the electronic device 1030. In this example, the electronic device 1030 determines that the obtained image of the identifier corresponds to a location "vehicle" and is further associated with the predetermined operation of displaying the location map 1010 of the electronic device, as shown in FIG. 10

In yet another example, the electronic device 1030 determines that the obtained image of the identifier does not correspond to any of the entries stored. Therefore, the electronic device performs a default predetermined operation. The default predetermined operation is performed in case when the identifier is not recognized. In another example, the predetermined operation associated with the unrecognized identifiers may be no action or event on the electronic device 1030.

The above method and device provide an easy access of the numerous applications available on the electronic device, to a user of the electronic device. The user can customize the electronic device for a personalized user experience at various locations. Accordingly, the amount of time and effort expended by the user in browsing through the plethora of applications is greatly reduced. The availability of dynamic update by the electronic device further helps to reduce the user's effort in updating the electronic device every time it is operated. The invention can be of critical use in some situations such as where an urgent access to a rather frequently used application is required and the amount of time available is scarce and limited.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic device for use with a docking station, the electronic device comprising:
    a housing;
    a circuit supported by the housing, wherein the circuit detects that the electronic device is coupled to the docking station;
    an imager supported by the housing, wherein the imager obtains an image of an identifier associated with the docking station;
    a processor communicating with the circuit and the imager, wherein the processor performs a predefined operation based on the image in response to detecting that the electronic device is coupled to the docking station; and
    a light source coupled to the circuit, wherein the light source illuminates the identifier associated with the docking station at least while the imager obtains the image, wherein the light source is further coupled to a light guide of the docking station, and the light guide directs light from the light source to the identifier.

2. The electronic device of claim 1, wherein the circuit detects that the electronic device is coupled to the docking station by detecting at least one of a physical connection or a wireless connection between the electronic device and the docking station.

3. The electronic device of claim 2, wherein the circuit detects that the electronic device is coupled to the docking station by detecting an increase in power received by one or more circuits of the electronic device from the docking station.

4. The electronic device of claim 1, wherein the identifier is at least one of a barcode, a symbol code, a color-coded dot, a Q-code, or a shape-coded indentation.

5. The electronic device of claim 1, wherein the imager is in line of sight of the identifier when the electronic device is coupled to the docking station.

6. The electronic device of claim 5, wherein the imager is situated offset from the identifier when the electronic device is coupled to the docking station.

7. The electronic device of claim 6, wherein the imager obtains the image of the identifier by adjusting a focal length of the imager.

8. The electronic device of claim 5, wherein the imager is positioned adjacent to the identifier when the electronic device is coupled to the docking station.

9. The electronic device of claim 8, wherein the identifier is at least one of a barcode, a symbol code, a Q-code, or a shape-code.

10. The electronic device of claim 8, wherein the identifier is at least one of a color coded dot, shape code identifier, or symbol code identifier and the imager obtains the image with a fixed focus.

11. The electronic device of claim 1, wherein the processor identifies a location associated with the image in response to obtaining the image and determines a list of electronic devices available at the identified location.

12. The electronic device of claim 11, wherein the electronic device establishes a wireless connection with at least one electronic device from the list of electronic devices.

13. A method for controlling an electronic device for use with a docking station, the method comprising:
    detecting a coupling of the electronic device with the docking station;
    obtaining an image of an identifier associated with the docking station in response to detecting the coupling;
    illuminating the identifier associated with the docking station at least while obtaining the image, wherein illuminating the identifier includes directing light from a light source to the identifier via a light guide of the docketing station; and
    performing a predefined operation by the electronic device based on the image of the identifier in response to obtaining the image.

14. The method of claim 13, wherein the performing further comprises:
    identifying an associated image from a plurality of images based on the obtained image; and performing the predefined operation based on the associated image.

15. The method of claim 14, further comprising processing the image prior to the identifying.

16. The method of claim 13, wherein the identifier includes at least one of a barcode, a symbol code, a color-coded dot, a Q-code, or a shape-code.

17. The method of claim 13, wherein the predefined operation includes at least one personalization setting including displaying at least one application on a display of the electronic device, adjusting a brightness of the display, adjusting a touch lens sensitivity of the display, adjusting a loudspeaker volume, or activating an input key.

* * * * *